United States Patent [19]

Takahata et al.

[11] Patent Number: 5,446,018
[45] Date of Patent: Aug. 29, 1995

[54] SUPERCONDUCTING BEARING DEVICE

[75] Inventors: Ryoichi Takahata, Yamatotakada; Motoaki Shibayama, Takamatsu, both of Japan

[73] Assignee: Koyo Seiko Co., Ltd., Takamatsu, Japan

[21] Appl. No.: 117,089

[22] PCT Filed: Mar. 13, 1992

[86] PCT No.: PCT/JP92/00302

§ 371 Date: Nov. 19, 1993

§ 102(e) Date: Nov. 19, 1993

[87] PCT Pub. No.: WO92/16761

PCT Pub. Date: Oct. 1, 1992

[30] Foreign Application Priority Data

Mar. 15, 1991 [JP] Japan .................. 3-051429

[51] Int. Cl.$^6$ .................. B60L 13/04; H02K 7/09
[52] U.S. Cl. .................. 310/90.5; 505/903
[58] Field of Search .................. 310/90, 90.5; 384/226, 384/227, 302, 303, 244, 246; 505/877, 878, 903

[56] References Cited

U.S. PATENT DOCUMENTS

| 4,412,703 | 11/1983 | Simonson .................. 384/21 |
| 4,797,386 | 1/1989 | Gyorge et al. .................. 505/1 |
| 5,083,053 | 1/1992 | New .................. 310/90.5 |
| 5,177,387 | 1/1993 | McMichael et al. .................. 310/90.5 |
| 5,314,868 | 5/1994 | Takahata et al. .................. 310/90.5 |

FOREIGN PATENT DOCUMENTS

| A0467341A1 | 10/1989 | European Pat. Off. . |
| 58-65321 | 4/1983 | Japan .................. 310/90.5 |
| 59-37323 | 2/1984 | Japan .................. 310/90.5 |
| 63-2662 | 1/1988 | Japan . |
| 64-41726 | 3/1989 | Japan . |
| 1-69360 | 5/1989 | Japan . |
| WO90/03524 | 5/1990 | WIPO . |

OTHER PUBLICATIONS

Herbert Herkimer, *Engineers' Illustrated Thesaurus*, 1952, pp. 142–145.
Proceedings of the 20th Intersociety Energy Conversion Engineering Conference. Energy for the Twenty-First Century. SAE P-164. vol. 2; Aug. 1985, Society of Automotive Engineers, Warrendale Pa. (U.S.); pp. 2449–2453; "Design Considerations for Magnetically Suspended Flywheel Systems." by Anant et al.

*Primary Examiner*—Clayton E. LaBalle
*Attorney, Agent, or Firm*—Popham, Haik, Schnobrich & Kaufman, Ltd.

[57] ABSTRACT

A superconducting bearing device for supporting a rotary shaft (rotary body) 2 in a noncontact state for rotation at a high speed. A superconducting bearing 4 for supporting the rotary shaft 2 in a noncontact state relative to a housing 1 comprises permanent magnets 14 mounted on the rotary shaft 2, and Type II superconductors 17 attached to the housing 1 and opposed to the magnets as vertically spaced apart therefrom. A mechanical catcher bearing 21 comprising a thrust ball bearing is disposed between the housing 1 and the rotary shaft 2 at opposed portions thereof. An initial position determining mechanism is provided for lifting a bearing ring 23 of the catcher bearing 21 on the housing 1 to position the housing 1 and the rotary shaft 2 in place relative to each other, whereby the superconductors 17 and the permanent magnets 14 on the shaft 2 can be positioned in place relative to each other. The superconducting bearing 4 can be operated efficiently by suitably determining the relative position. The catcher bearing 21 prevents damage to the rotary shaft 2 and parts therearound when the superconductors 17 of the bearing 4 become normally conductive.

9 Claims, 2 Drawing Sheets

SUPERCONDUCTING BEARING DEVICE

TECHNICAL FIELD

The present invention relates to superconducting bearing devices, for example, for use in hydraulic machines and machine tools which require high-speed rotation, or power storage apparatus for storing excessive electric power as converted to kinetic energy of a flywheel.

BACKGROUND ART

Superconducting bearings devices already known include those disclosed, for example, in the specifications of U.S. Pat. Nos. 4,886,778 and 4,892,863.

These superconducting bearing devices have incorporated therein a Type II superconductor, i.e., a superconductor which permits penetration of the magnetic flux of a permanent magnet in a temperature environment which realizes a Type II superconducting state. The superconducting bearing device comprises a permanent magnet mounted on a rotary body, and a Type II superconductor provided on a fixed portion and opposed to the magnet.

However, the superconducting bearing device has the problem of being low in operation efficiency since the device has no mechanism for determining the position of the superconductor and the permanent magnet relative to each other when the device is to be initiated into operation. Further the device has the problem that the rotary body and parts therearound become damaged or broken should the superconductor be made normally conductive (quenched).

An object of the present invention is to provide a superconducting bearing device which is free of these problems.

DISCLOSURE OF THE INVENTION

The present invention provides a superconducting bearing device adapted to rotatably support a rotary body by a superconducting bearing in a noncontact state, the rotary body being so disposed as to be movable relative to a fixed portion in the direction of axis of rotation and in a direction orthogonal to the direction of rotation axis, the rotary body being rotatable relative to the fixed portion, the superconducting bearing device being characterized in that the superconducting bearing comprises a permanent magnet mounted on the rotary body, and a Type II superconductor attached to the fixed portion and opposed to the magnet, the permanent magnet being so mounted on the rotary body that the rotation of the rotary body will not alter the magnetic flux distribution around the axis of rotation of the rotary body, the Type II superconductor permitting the penetration of magnetic flux of the permanent magnet thereinto in a temperature environment realizing a Type II superconducting state and being so attached to the fixed portion as to be disposed at a position which is spaced apart from the magnet by a distance permitting a predetermined quantity of magnetic flux thereof to penetrate thereinto and which will not permit the rotation of the rotary body to alter the distribution of penetrating magnetic flux, opposed portions being provided between the fixed portion and the rotary body to position the former below the latter, a mechanical catcher bearing being disposed at the opposed portions and having a bearing member on the fixed portion side, an initial position determining mechanism being provided between the fixed portion and the rotary body for lifting the bearing member to determine the position of the fixed portion and the rotary body relative to each other.

Preferably, the mechanical catcher bearing is a thrust ball bearing provided concentrically with the rotary body, the thrust ball bearing having a bearing ring attached to the fixed portion and another bearing ring attached to the rotary body, the bearing ring on the fixed portion being movable upward and downward.

Alternatively, the mechanical catcher bearing is a thrust slide bearing provided concentrically with the rotary body and having a slide ring attached to the fixed portion. The slide ring is formed on an upper surface thereof with an upwardly tapered annular ridge, and is movable upward and downward. The rotary body is concentrically formed in a portion thereof opposed to the ridge with an annular recessed portion approximately inverted V-shaped in cross section for the ridge to fit in. The slide ring and the recessed portion provide the thrust slide bearing.

With the bearing device described, the permanent magnet and the Type II superconductor of the bearing are held spaced apart by a predetermined distance as opposed to each other by the restraining action of the flux of the permanent magnet penetrating into the conductor. In this state, the rotary body carrying the permanent magnet can be rotated about its axis. At this time, the magnetic flux penetrating into the Type II superconductor offers no resistance to the rotation insofar as the magnetic flux distribution is uniform about the axis of rotation and remains unaltered. Accordingly, the rotary body can be supported in a noncontact state with respect to the axial direction and radial direction merely by positioning the permanent magnet provided on the rotary body in place relative to the Type II superconductor.

When the bearing member of the mechanical catcher bearing on the fixed portion side is raised by the initial position determining mechanism before the bearing device is initiated into operation, the rotary body is lifted to position the fixed portion and the rotary body in place axially of the rotary body and also with respect to the radial direction orthogonal to the axis of rotation of the rotary body, whereby the Type II superconductor on the fixed portion and the permanent magnet on the rotary body can be set in position relative to each other. When the relative position is determined suitably, the superconducting bearing can be operated efficiently.

The mechanical catcher bearing is disposed at the opposed portions which are provided between the fixed portion and the rotary body so as to position the former below the latter, whereby the rotary body and parts therearound are protected from damage or breakage even if the Type II superconductor should become normally conductive.

BEST MODE OF CARRYING OUT THE INVENTION

Figure 1:
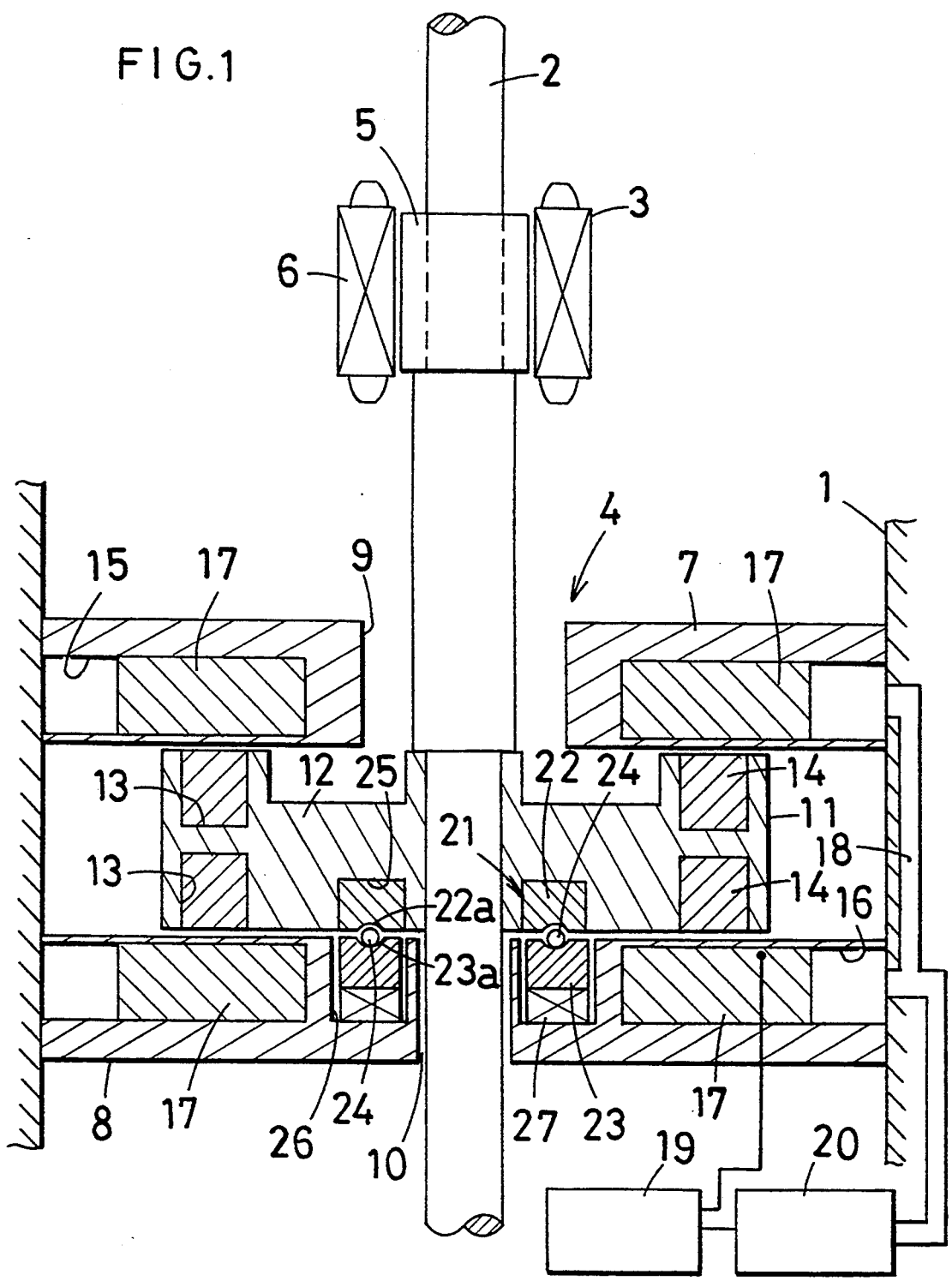
FIG. 1 is a view in vertical section schematically showing a superconducting bearing device as a first embodiment of the invention.

The present invention will be described below in greater detail with reference to the accompanying drawings. In the following description, like parts are designated by like reference numerals.

FIG. 1 schematically shows the overall construction of a first embodiment, i.e., a superconducting bearing device. The bearing device comprises a housing (fixed portion) 1 disposed vertically, and a vertical rotary shaft (rotary body) 2 which is to be rotatingly supported in a noncontact state in the center of the housing 1.

Arranged inside the housing 1 are a high-frequency electric motor 3 for rotating the rotary shaft 2 at a high speed, and a superconducting bearing 4 positioned below the motor for supporting the rotary shaft 2.

The motor 3 comprises a rotor 5 attached to the rotary shaft 2, and a stator 6 disposed around the rotor 5 and attached to the housing 1 by an unillustrated support member.

The superconducting bearing 4 has the following construction. A pair of horizontal annular bodies 7, 8 vertically spaced apart by a predetermined distance are fixed to the inner periphery of the housing 1. The annular bodies 7, 8 respectively have through bores 9, 10 vertically extending therethrough centrally thereof. The rotary shaft 2 is inserted through these bores 9, 10 with a clearance formed therearound. The lower bore 10 is smaller than the upper bore 9 in diameter.

Between the upper and lower annular bodies 7, 8, a horizontal disk-line permanent magnet portion 11 is mounted on the rotary shaft 2 concentrically therewith. The magnet portion 11 has a horizontal disk 12 fixed to the rotary shaft 2. An annular groove 13 concentric with the rotary shaft 2 is formed in each of the upper and lower surfaces of the disk 12. An annular permanent magnet 14 is fixedly fitted in the groove 13. These permanent magnets 14 are so provided that the magnetic flux distribution about the axis of rotation of the rotary shaft 2 will not be altered by rotation.

The two annular bodies 7, 8 are formed with annular hollow portions 15, 16, respectively, inside thereof. A plurality of Type II superconductors 17 are circumferentially arranged close to one another at equal spacings in each of the hollow portions. The superconductors 17 comprise a substrate made of yttrium high-temperature superconducting material, such as $YBa_2Cu_3O_x$, and incorporating normally conducting particles ($Y_2Ba_1Cu_1$) as uniformly mixed with the material, and having properties to restrain the magnetic flux emitted by the permanent magnet 14 and penetrating thereinto in an environment realizing a Type II superconducting state. The superconductors 17 are arranged at a position spaced apart from the magnet and permitting a specified quantity of magnetic flux of the magnet to penetrate thereinto, the position being such that the penetrating flux distribution will not be altered by the rotation of the rotary body 2.

The upper and lower hollow portions 15, 16 communicate with each other through a channel 18 formed in the housing 1. The communication channel 18 is connected to a cooling unit 20 having a temperature control unit 19. A refrigerant such as liquid nitrogen is circulated through the channel 18 and the hollow portions 15, 16 by the cooling unit 20 to cool the superconductors 17 with the refrigerant filling up the hollow portions 15, 16. Accordingly, the Type II superconductors 17 are brought into the Type II superconducting state, and many of the magnetic fluxes emitted from the permanent magnets 14 of the magnet portion 11 penetrate into the superconductors 17 and are thereby restrained (pinning phenomenon). With the particulate normal conductor uniformly present in the superconductors 17, the distribution of fluxes penetrating into the superconductors 17 is held constant, with the result that the rotary body 2 is arrested by the superconductors 17 along with the magnet portion 11 as if the magnets 14 are pierced with phantom pins vertically extending from the superconductors 17. For this reason, the rotary body 2 is supported with respect to the radial and axial directions, as held levitated with high stability.

A mechanical catcher bearing 21 comprising a ceramic thrust ball bearing is provided concentrically with the rotary shaft 2 between the lower surface of the permanent magnet portion 11 and the upper surface of the lower annular body 8 at opposed portions thereof. The bearing 21 has an upper bearing ring 22 fixedly fitted in an annular groove 25 formed in the lower surface of the disk 12 concentrically therewith, and a lower bearing ring 23 disposed in an annular groove 26 which is formed in the upper surface of the annular body 8 and opposed to the groove 25. The bearing ring 23 is movable upward and downward and slightly movable radially. A plurality of balls 24 are arranged between the raceway surfaces 22a, 23a of the respective bearing rings 22, 23. A lift device 27 for moving the bearing ring 23 is disposed inside the groove 26 below the ring 23. The lift device 27 comprises, for example, a plurality of piezoelectric elements arranged in superposed layers. The mechanical catcher bearing 21 and the lift device 27 constitute an initial position determining mechanism for positioning the annular body 8 and the magnet portion 11 in place relative to each other.

If the superconductors 17 of the bearing 4 should become normally conductive and unable to afford a support force during operation, the upper bearing ring 22 of the mechanical catcher bearing 21 comes into contact with the balls 24 arranged on the raceway surface 23a of the lower bearing ring 23, whereby the rotary shaft 2 in rotation is supported. This precludes damage to or break of the rotary shaft 2 and parts therearound.

During operation, the lift device 27 remains lowered in an operation position, and the rotary shaft 2 is supported by the superconducting bearing 4 as previously stated, whereby the upper bearing ring 22 is held out of contact with the balls 24. Further the rotary shaft 2 is in rotation as supported approximately in the center of the housing 1, and the permanent magnet portion 11 is supported approximately at the vertically middle portion between the two annular bodies 7, 8.

While the device is out of operation, the supply of the refrigerant form the cooling unit 20 is also discontinued. Accordingly, the superconductors 17 are in the normally conductive state, producing no support force. The rotary shaft 2 is therefore at rest as supported by the mechanical catcher bearing 21 on the housing 1.

The bearing device thus out of operation is initiated into operation in the following manner.

First, the lower bearing ring 23 of the catcher bearing 21 is raised to a predetermined position by the lift device 27. With the rise of the bearing ring 23, the balls contact the raceway surfaces 22a, 23a of the rings 22, 23, lifting the rotary shaft 2 to position the lower annular body 8 and the permanent magnet portion 11 in place with respect to the vertical direction. At the same time, the raceway surfaces 22a, 23a of the bearing rings 22, 23 of the catcher bearing 24 and the balls 24 thereof contact to position the annular body 8 and magnet portion 11 in place with respect to the radial direction. At this time, the upper permanent magnet 14 is positioned close to the lower surface of the upper annular body 7, and the distance from the lower surface of the upper annular body 7 to the upper surface of the upper magnet 14 is smaller than the distance from the upper surface of the lower annular body 8 to the lower surface of the lower magnet 14.

With the rotary shaft 2 thus positioned, the refrigerant is circulated through the hollow portions 15, 16 by the cooling unit 20 to cool the superconductors 17. When the superconductors 17 are refrigerated to the superconducting state, a support force is produced as previously described, so that the initial position determining mechanism 27 is lowered to the operation position for the mechanism 27 to afford no support, whereupon the rotary shaft 2 slightly lowers under gravity and comes to a halt at a position where it is in balance with the force of magnetic repulsion and pinning force of the superconducting bearing 4. As a result, the magnet portion 11 is supported approximately at the vertically middle position between the two annular bodies 7, 8, and the rotary shaft 2 is supported in a noncontact state as previously described. The rotary shaft 2 is therefore rotated by the motor 3 for the start of operation.

Figure 2:
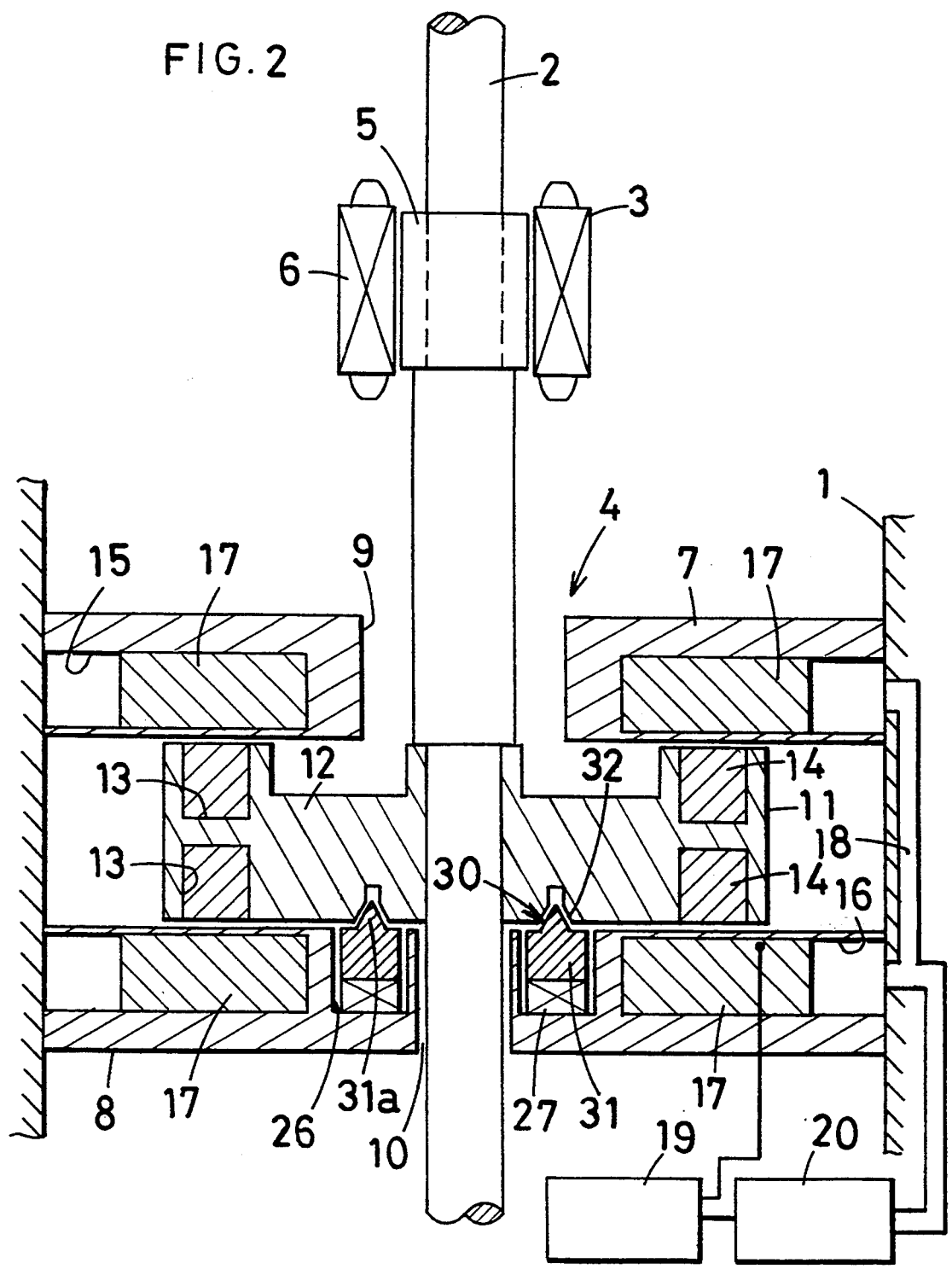
FIG. 2 is a view in vertical section schematically showing a superconducting bearing device as a second embodiment of the invention.

FIG. 2 schematically shows the overall construction of another superconducting bearing device, i.e., a second embodiment. In this case, a mechanical catcher bearing 30 comprising a thrust slide bearing is provided concentrically with the rotary shaft 2 between the lower surface of the permanent magnet portion 11 and the upper surface of the lower annular body 8. The bearing 30 has a slide ring 31 disposed inside the annular groove 26 in the upper surface of the annular body 8 and movable upward and downward and also slightly movable in the radial direction. The slide ring 31 is formed on the upper surface thereof with an upwardly tapered ridge 31a extending along the entire circumference of the ring. The lower surface of the disk 12 is formed at the portion thereof opposed to the ridge 31a with an annular groove (recessed portion) 32 approximately inverted V-shaped in cross section, concentric with the disk and extending along the entire circumference for the ridge 31a to fit in. The slide ring 31 and the annular groove 32 constitute the thrust slide bearing. This bearing 30 and the lift device 27 constitute an initial position determining mechanism for positioning the annular body 8 and the permanent magnet portion 11 in place relative to each other.

Should the superconductors 17 of the superconducting bearing 4 become normally conductive and unable to give a support force during operation, the ridge 31a on the slide ring 31 of the catcher bearing 30 comes into sliding contact with the surface defining the annular groove 32 in the lower surface of the disk 12, whereby the rotary shaft 2 in rotation is supported. This prevents damage to the rotary shaft 2 and parts therearound.

The present embodiment is in the same state as the first embodiment during operation or while out of operation.

When the bearing device as held out of operation is to be operated, the slide ring 31 of the mechanical catcher bearing 30 is first raised by the lift device 27. With the rise of the slide ring 31, the ridge 31a snugly fits into the annular groove 32, lifting the rotary shaft 2, whereby the lower annular body 8 and the permanent magnet portion 11 are positioned in place with respect to the vertical direction and also with respect to the radial direction. This positions the rotary shaft 2 and the housing 1 in place relative to each other.

INDUSTRIAL APPLICABILITY

The device of the invention is suitable, for example, for use in hydraulic machines and machine tools which require high-speed rotation, or power storage apparatus for storing excessive electric power as converted to kinetic energy of a flywheel.

We claim:

1. A superconducting bearing device adapted to rotatably support a rotary body in a noncontact state, the rotary body being so disposed as to be movable relative to a fixed portion in the direction of an axis of rotation of said rotary body and in a direction orthogonal to the direction of the axis, the rotary body being rotatable relative to the fixed portion, the superconducting bearing device comprising:

a permanent magnet mounted on the rotary body;
   a Type II superconductor attached to the fixed portion and opposed to the magnet, the permanent magnet being so mounted on the rotary body that rotation of the rotary body will not alter magnetic flux distribution around the axis of rotation of the rotary body, the Type II superconductor permitting the penetration of magnetic flux of the permanent magnet thereinto in a temperature environment realizing a Type II superconducting state and being so attached to the fixed portion as to be disposed at a position which is spaced apart from the magnet by a distance permitting a predetermined quantity of magnetic flux thereof to penetrate thereinto and which will not permit the rotation of the rotary body to alter the distribution of penetrating of magnetic flux, opposed portions being provided between the fixed portion and the rotary body; and
   an initial position determining mechanism being provided at the opposed portions for positioning the fixed portion and the rotary body relative to each other so that magnetic flux from the magnet is pinned to the superconductor, the initial position determining mechanism comprising an annular portion provided concentrically with the rotary body and a ring which is movable in the direction of the axis of rotation, the ring disposed on the fixed portion and corresponding to the annular portion, a recessed portion and a ridge portion being so provided between the annular portion and the ring as to be related to each other for determining the position of the fixed portion and the rotary body relative to each other when the ring is moved in the direction of the axis.

2. A superconducting bearing device as defined in claim 1, wherein the initial position determining mechanism is provided concentrically with the rotary body, the mechanism having a thrust ball bearing wherein a raceway surface is formed respectively on each of the bearing rings, a plurality of balls being disposed between the raceway surfaces of the rings, the thrust ball bearing having one bearing ring attached to the fixed portion and the other bearing ring attached to the rotary body, the bearing ring on the fixed portion being movable in the direction of the axis of rotation.

3. A superconducting bearing device as defined in claim 1, wherein the initial position determining mechanism has a thrust slide bearing provided concentrically with the rotary body, the thrust slide bearing comprising a slide ring attached to the fixed portion and having a tapered ridge portion on a surface thereof, and an annular recessed portion opposed to the ridge portion of the rotary body and concentric therewith, the annular recessed portion being approximately inverted V-shaped in cross section to be engaged with the ridge portion, the slide ring being movable in the direction of the axis of rotation.

4. A superconducting bearing device as defined in claim 1, where in the initial position determining mechanism functions as a mechanical catcher bearing in response to said magnet and said Type II superconductor failing to support said rotary device.

5. A process for initiating a superconducting bearing device into operation, the superconducting bearing device having a superconducting bearing and an initial position determining mechanism;

the superconducting bearing comprising a permanent magnet mounted on a rotary body and a Type II superconductor attached to a fixed portion to be opposed to the magnet and positioned in a magnetic field of the magnet;

the permanent magnet being so mounted on the rotary body that the rotation of the rotary body will not alter the magnetic flux distribution around the axis of rotation of the rotary body;

the Type II superconductor permitting the penetration of magnetic flux of the permanent magnet thereinto in a temperature environment realizing a Type II superconducting state and being so attached to the fixed portion as to be disposed at a position which is spaced apart from the magnet by a distance permitting a predetermined quantity of magnetic flux thereof to penetrate thereinto and which will not permit the rotation of the rotary body to alter the distribution of penetrating magnetic flux; the initial position determining mechanism being formed at opposed portions provided between the fixed portion and the rotary body, the mechanism determining the position of the fixed portion and the rotary body relative to each other until the magnetic flux of the permanent magnet is pinned to the superconductor to start the rotation of the rotary body, the mechanism comprising an annular portion provided concentrically with the rotary body and a ring which is movable along the axis of rotation, the ring disposed on the fixed portion and corresponding to the annular portion, a recessed portion and ridge portion being so provided between the annular portion and the ring as to be related to each other for determining the position of the fixed portion and the rotary body relative to each other when the ring is moved toward the rotary body; the process comprising the steps of:

(a) moving the rotary body by engaging the ring with the ridge portion, and determining the position of the fixed portion and the rotary body relative to each other based on a relationship between the recessed portion and the ridge portion, and thereby placing the Type II superconductor at a position which is spaced apart from the permanent magnet by a distance permitting a predetermined quantity of magnetic flux thereof to penetrate thereinto, and magnetizing the Type II superconductor by a magnetic field of the magnet;

(b) following the step (a), cooling the Type II superconductor to maintain the Type II superconductor in a temperature environment realizing a Type II superconducting state, and pinning the magnetic flux which was penetrated into the superconductor; and (c) following the step (b), disengaging the ring so that the ring affords no support for the rotary body, whereupon the rotary body is suspended stably at a position where weight of the rotary body is in balance with the force of magnetic repulsion and pinning force of the superconducting bearing.

6. A superconducting bearing device, for allowing for rotation of a rotary body about an axis of rotation within a fixed portion, the rotary body being movable relative to said fixed portion in the direction of the axis and in a direction orthogonal to the direction of the axis, the superconducting bearing device comprising:

a permanent magnet mounted on the rotary body having a magnetic flux distribution that is symmetric about the axis of rotation;

a Type II superconductor, attached to the fixed portion and opposed to the magnet;

opposed portions provided between the fixed portion and the rotary body;

an initial position determining mechanism, provided at the opposed portions for positioning the fixed portion and the rotary body relative to each other; and a lift device, coupled to said initial positioning device, for adjusting the position of the rotary body with respect to the fixed portion so as to permit the penetration of a predetermined quantity of magnetic flux of the permanent magnet into the superconductor when the superconductor is in a superconducting state, wherein said predetermined quantity of flux provides support during rotation of the rotary body so that the rotary body is out of contact with the fixed portion.

7. A superconducting bearing device as defined in claim 6, wherein the initial position determining mechanism is provided concentrically with the rotary body, the mechanism having a thrust ball bearing wherein raceway surfaces are formed on upper and lower bearing rings, a plurality of balls being disposed between the raceway surfaces of the rings, the thrust ball bearing having one bearing ring attached to the fixed portion and the other bearing ring attached to the rotary body, the bearing ring on the fixed portion being movable in the direction of the axis.

8. A superconducting bearing device as defined in claim 6, wherein the initial position determining mechanism has a thrust slide bearing provided concentrically with the rotary body, the thrust slide bearing comprising a slide ring attached to the fixed portion and having a tapered ridge portion on a surface thereof, and an annular recessed portion opposed to the ridge portion of the rotary body and concentric therewith, the annular recessed portion being approximately inverted V-shaped in cross section to be engaged with the ridge portion, the slide ring being formed on a surface thereof with a tapered annular ridge, the annular recessed portion being formed in the rotary body concentrically therewith at a portion thereof opposed to the annular ridge for the ridge to fit in, the slide ring being movable in the direction of the axis.

9. A superconducting bearing device as defined in claim 6, where in the initial position determining mechanism functions as a mechanical catcher bearing in response to said magnet and said Type II superconductor failing to support said rotary device.

* * * * *